(12) United States Patent
Kim et al.

(10) Patent No.: US 6,539,005 B1
(45) Date of Patent: Mar. 25, 2003

(54) METHOD FOR SEARCHING ACCESS CHANNEL AND ALLOCATING FINGER FOR BASE STATION

(75) Inventors: Dong-Hun Kim, Kyonggi-do (KR); Chae-Hun Chung, Kyonggi-do (KR)

(73) Assignee: Hyundai Electronics Industries Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/352,532

(22) Filed: Jul. 13, 1999

(30) Foreign Application Priority Data

Jul. 13, 1998 (KR) .......................................... 98-28179

(51) Int. Cl.[7] ............................................... H04J 13/02
(52) U.S. Cl. ...................... 370/335; 370/342; 370/441
(58) Field of Search ................................ 370/329, 341, 370/342, 346, 347, 350, 335, 441; 375/140, 267, 347; 455/450, 452, 63, 67.3

(56) References Cited

U.S. PATENT DOCUMENTS 5,956,367 A * 9/1999 Koo et al. .................. 370/335
6,069,883 A * 5/2000 Ejzak et al. ................ 370/342

FOREIGN PATENT DOCUMENTS

WO     WO 99/01002     1/1999

* cited by examiner

Primary Examiner—Thanh Cong Le
(74) Attorney, Agent, or Firm—J. Harold Nissen; Myron Greenspan; Lackenbach & Siegel, LLP

(57) ABSTRACT

A method for searching an access channel and allocating a finger for a base station is disclosed. The method includes a first step for searching an access channel signal, selecting a highest search critical value among the offsets having a search energy above a search critical value, allocating a finger in accordance with a path via which the selected offset signal is received and demodulating the signal, and a second step for checking whether an access channel probe period which corresponds to the time required until an access channel message unit is received and decoded is elapsed, stopping a search of a new multiple signal component to minimize any interference of the deciding operation of an access channel signal of another mobile station when one access channel probe period is not elapsed and feeding back to the first step when the access channel probe period is elapsed, for thereby preventing an interference for an access channel signal between the mobile stations by stopping a signal search operation of a search unit after a search unit of a base station allocates an offset to a finger with respect to an access channel signal of a certain mobile station and preventing a multiple path signal, which may be an access channel signal from a new mobile station during an access channel probe period which corresponds to a duration needed for obtaining one access channel signal by a base station, from being reallocated to a finger.

7 Claims, 11 Drawing Sheets

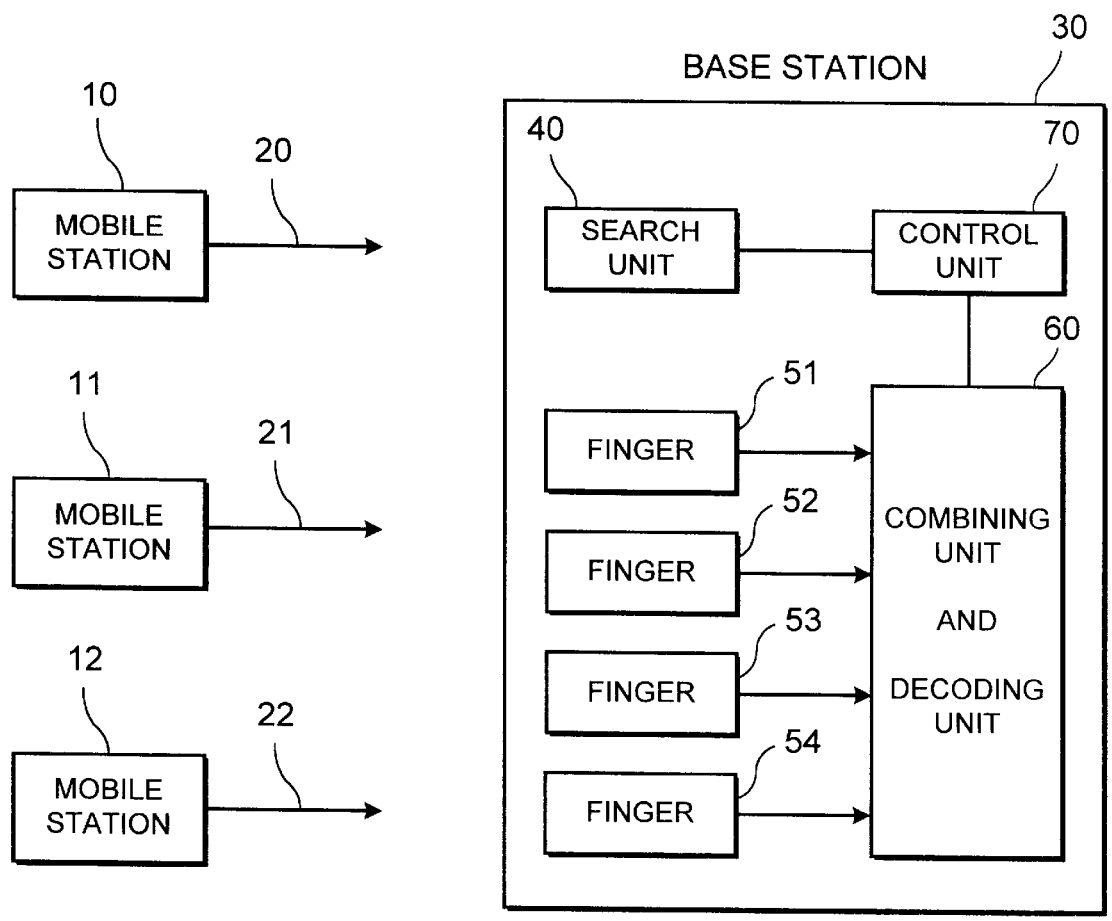
F I G. 2

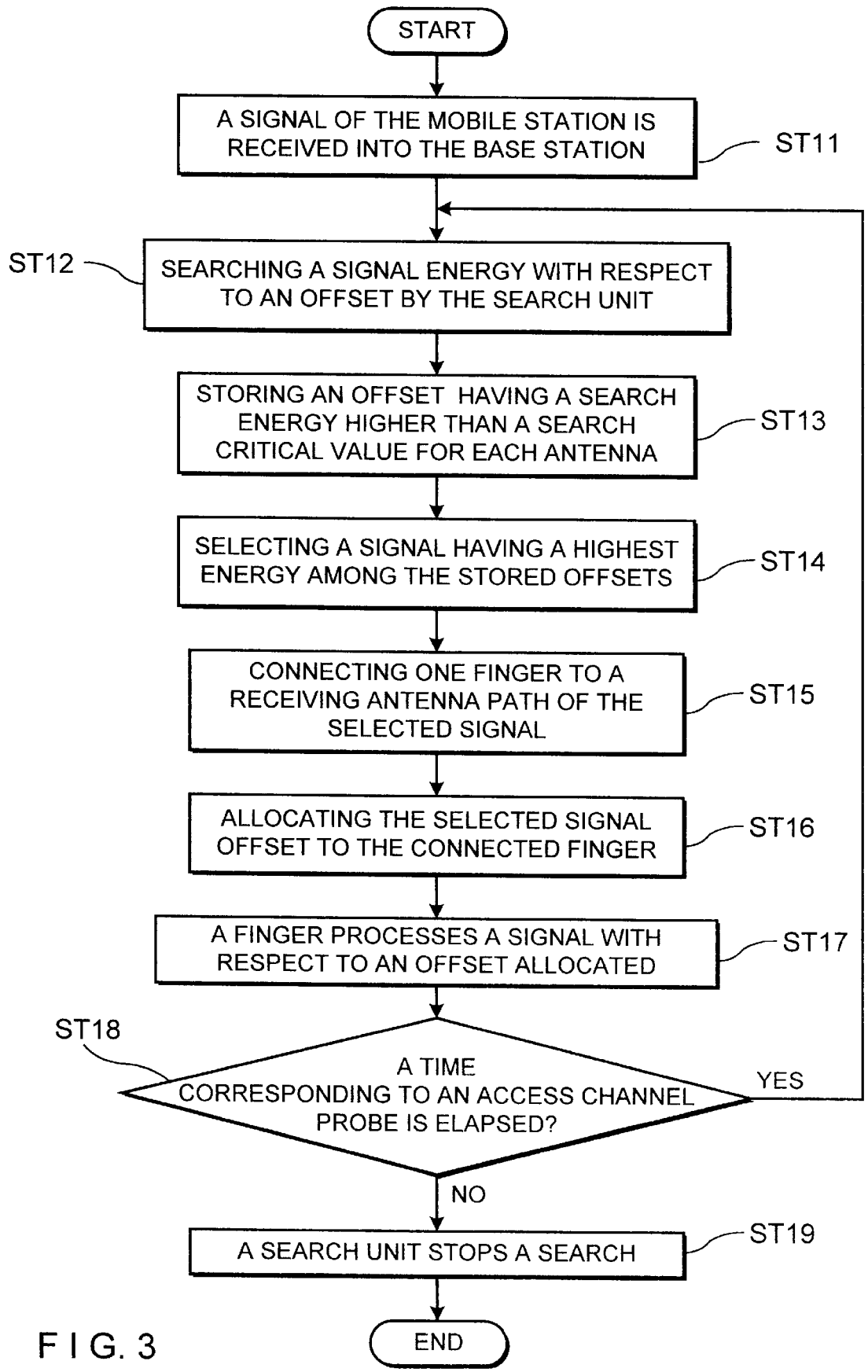
F I G. 3

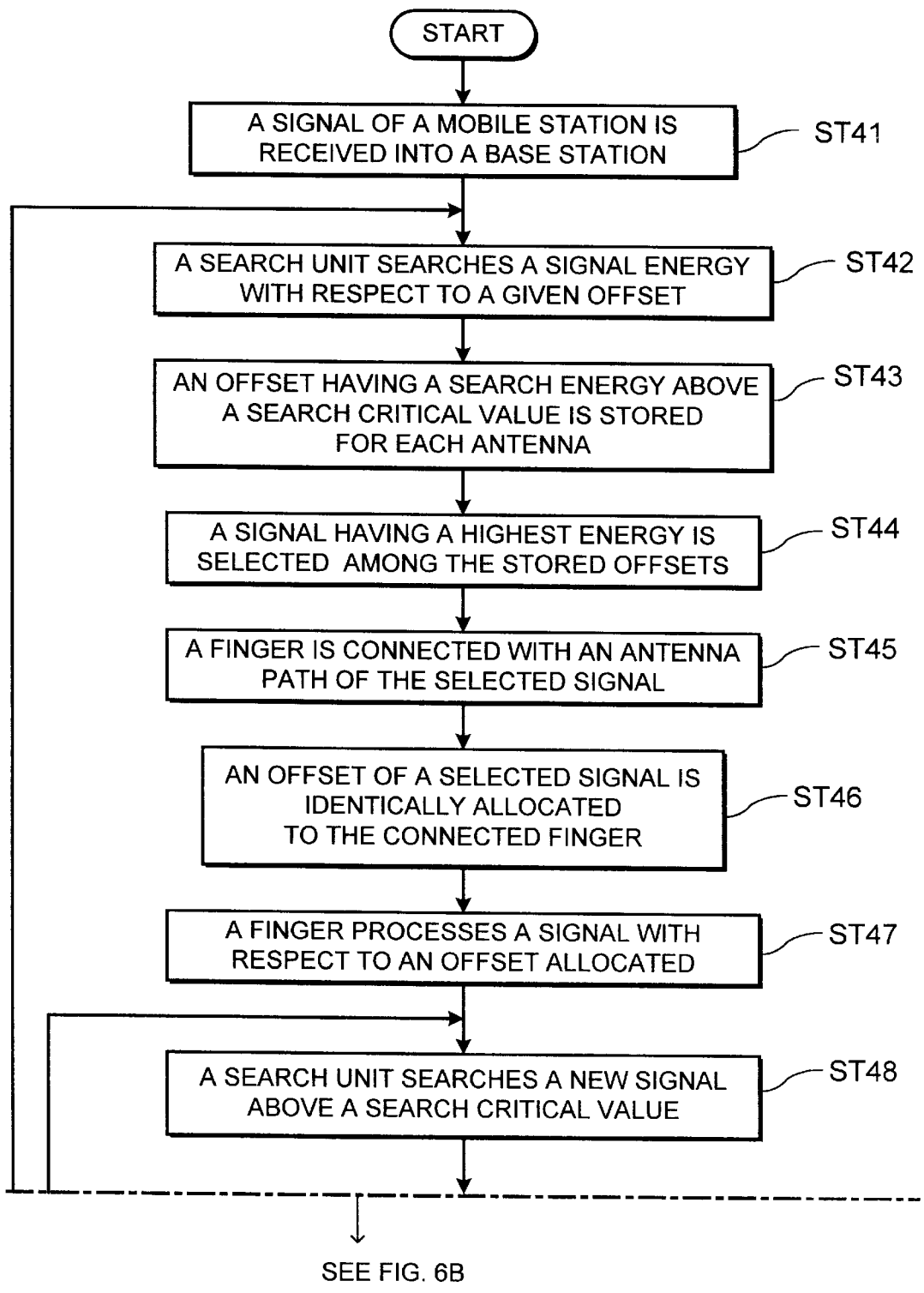
F I G. 6A

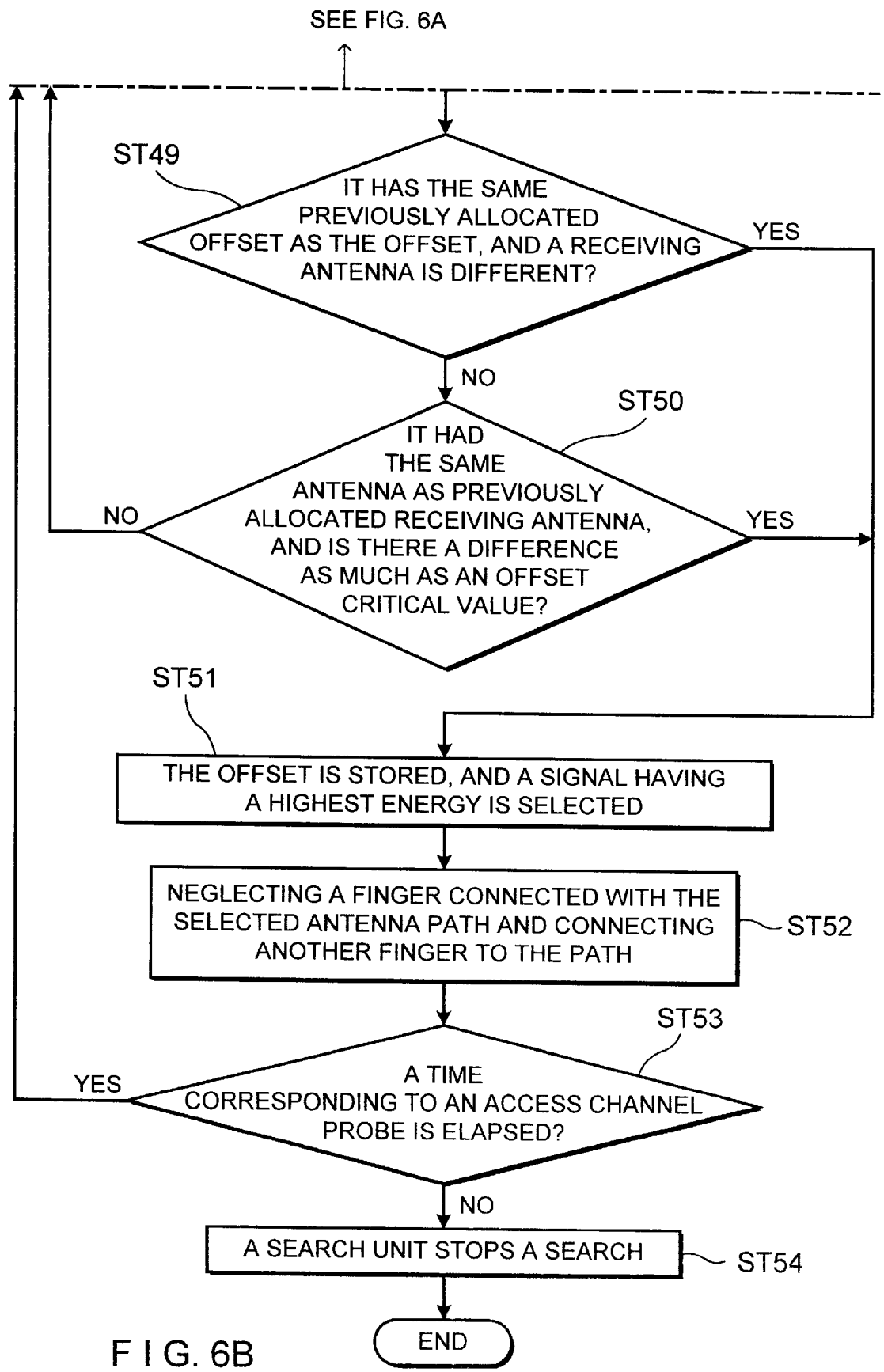
F I G. 6B

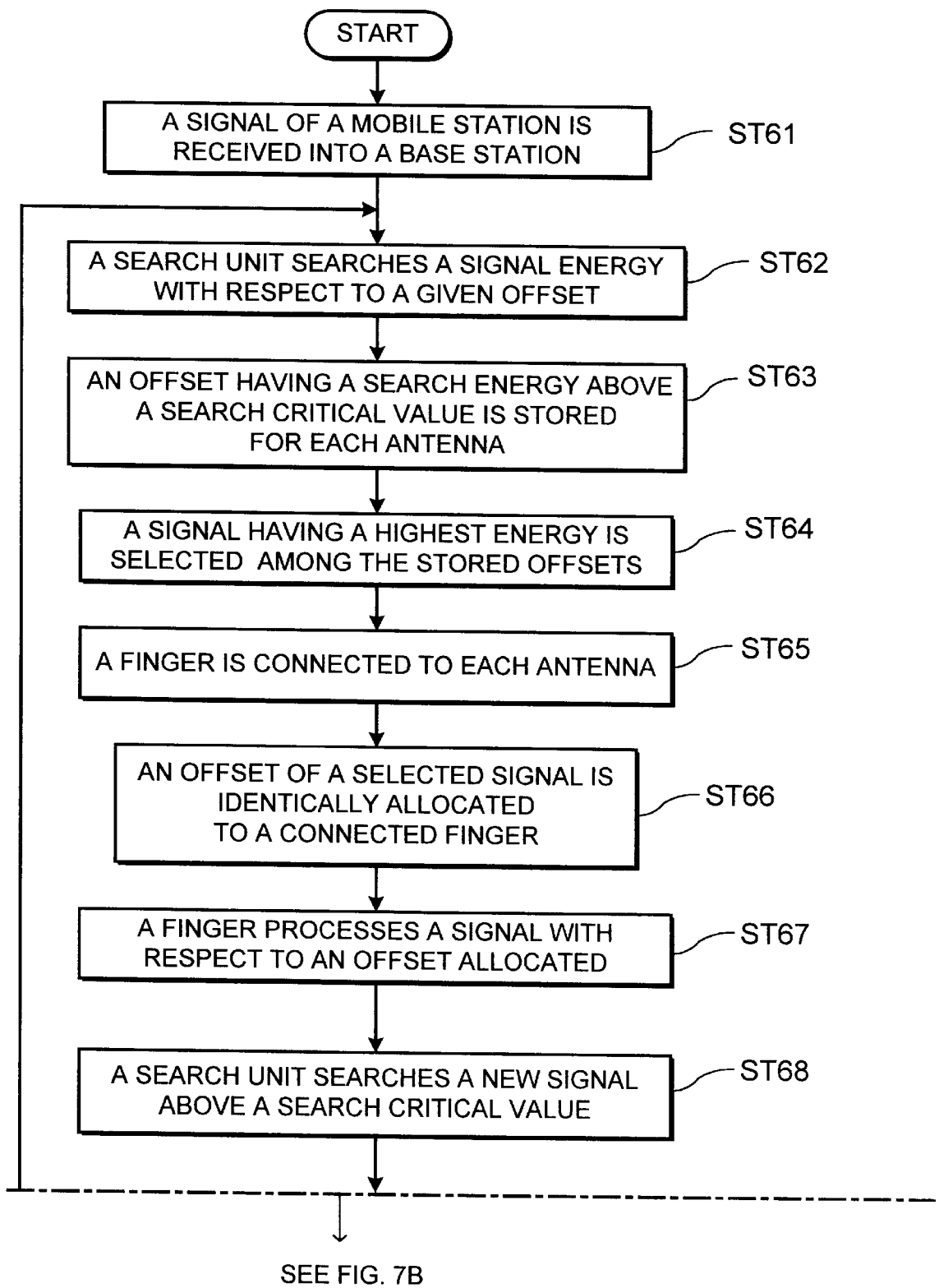
F I G. 7A

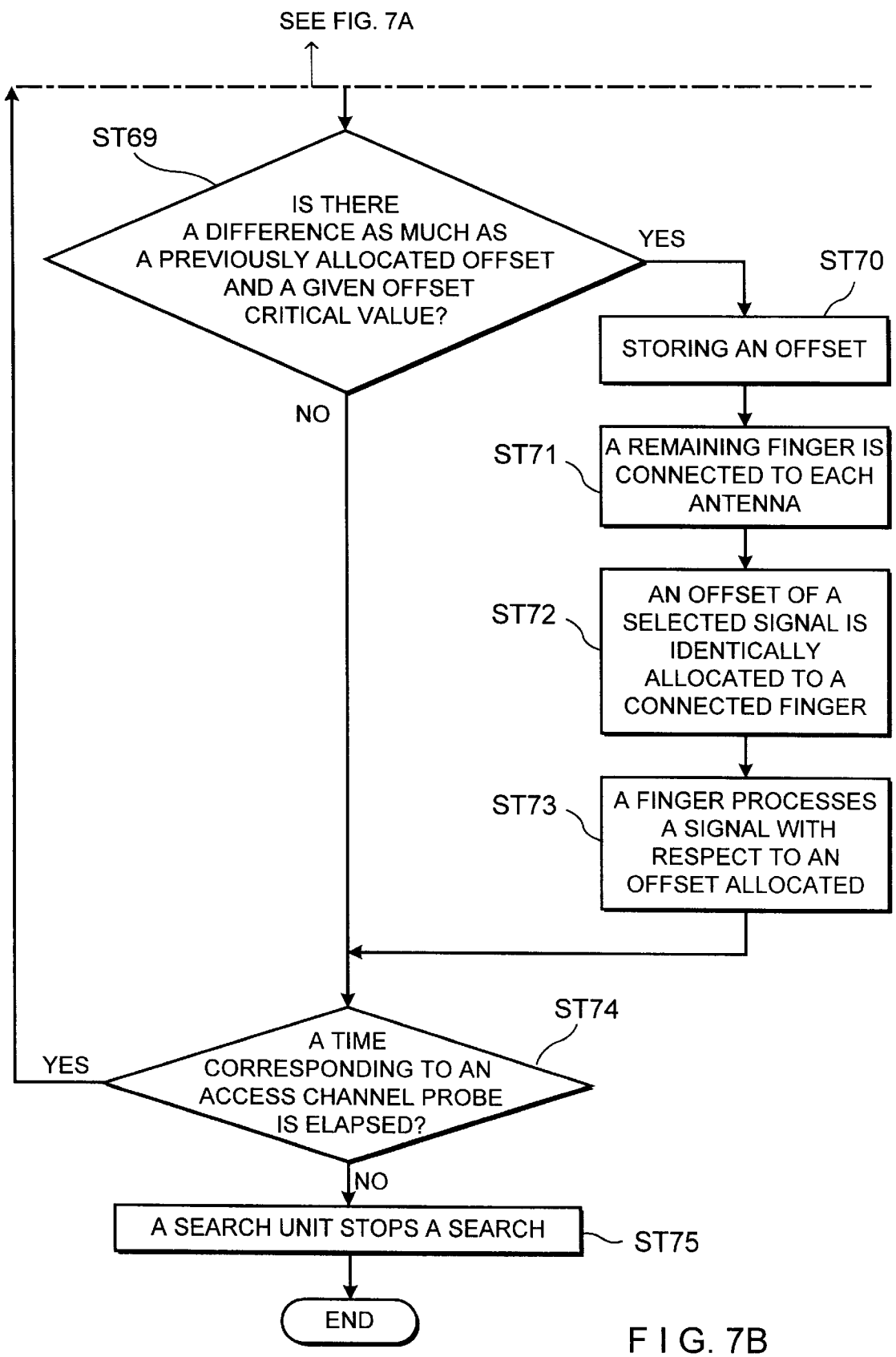
F I G. 7B

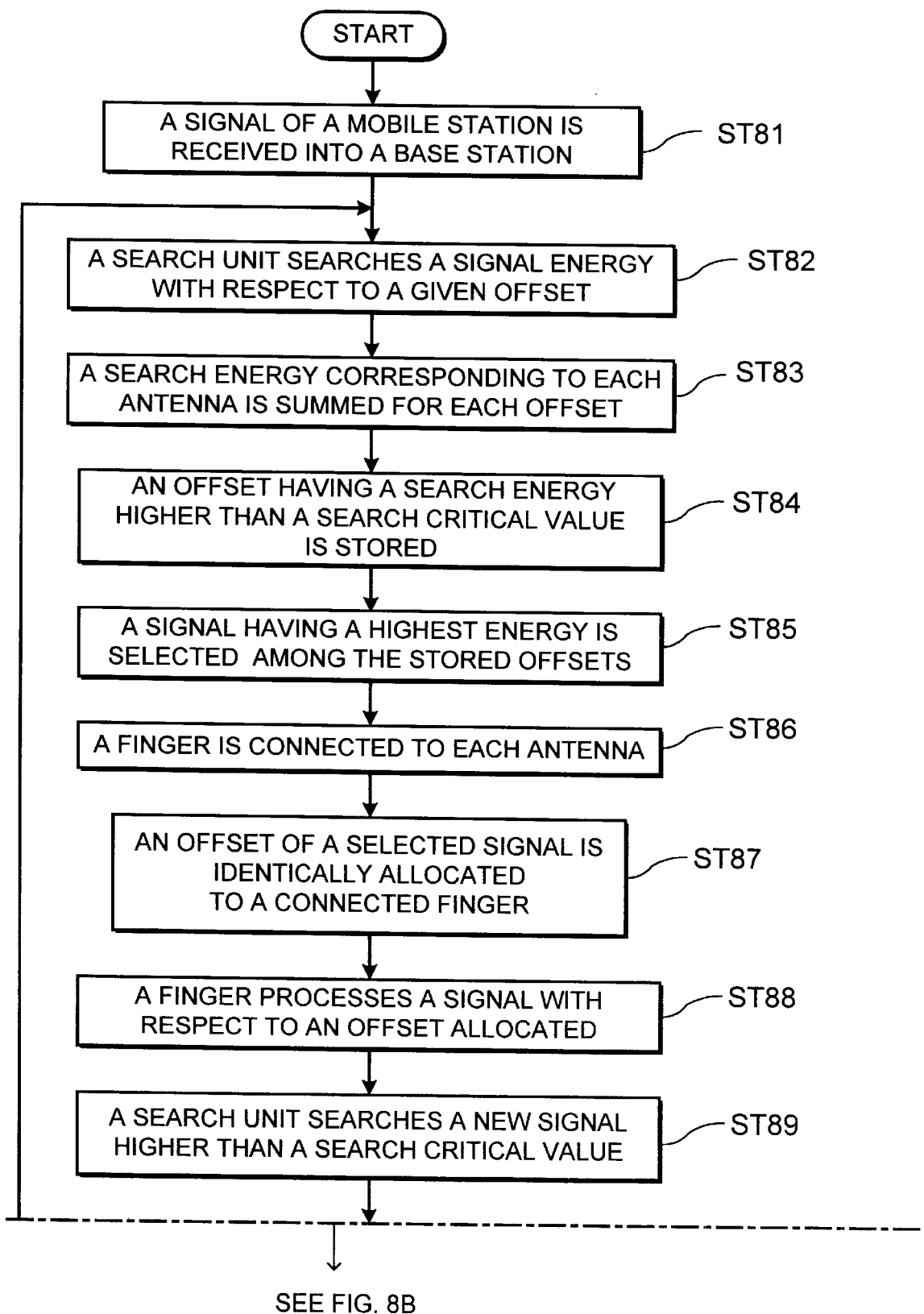
F I G. 8A

METHOD FOR SEARCHING ACCESS CHANNEL AND ALLOCATING FINGER FOR BASE STATION

BACKGROUND OF THE INVENTION

1. Field of the Invention

The present invention relates to a method for searching an access channel and allocating a finger for a base station, and in particular to an improved method for searching an access channel and allocating a finger for a base station which is capable of implementing a mobile communication system such as a DCS(Digital Control System) using a CDMA (Code division Multiple Access), a PCS(Personal Communication System) and a satellite communication system.

2. Description of the Background Art

Generally, a mobile communication system is a communication system capable of receiving a communication service.

In the above-described mobile communication system, a mobile station is capable of transmitting a signal to a base station for receiving a mobile communication service. At this time, the signal from the mobile station is directly transmitted to the base station or is reflected by a certain building and then is transmitted to the base station. Namely, the signals transmitted to the base station may have a certain delay time based on multiple paths. The base station demodulates the signals from the mobile station received through multiple paths and transmits to a control station.

When the mobile station requests a call transmission, in a state that the mobile station does not receive a certain service from the base station, when transmitting a short signal to the base station, an access channel is used. The above-described access channel is a CDMA channel that the mobile station transmits a signal to the base station in the reverse direction in a state that a communication channel is not set between the mobile station and the base station. In addition, in this access channel, different offsets may allocated for preventing the signals from being concurrently transmitted from a plurality of mobile stations to the base station via the access channel.

FIG. 1 is a flow chart illustrating a conventional method for searching an access channel and allocating a finger for a base station in a conventional mobile communication system.

As shown therein, the method for searching an access channel and allocating a finger for a conventional mobile communication system includes steps ST1 through ST3 for searching a search energy for an access channel for each antenna, comparing with a search critical value and storing an offset which exceeds the search critical value, steps ST4 through ST6 for selecting an offset having the highest search energy among the stored offsets, allocating the selected offset to the finger for each antenna, and demodulating the same, and steps ST7 through ST9 for searching a multiple path signal of the offset for each antenna, allocating the offsets which are not allocated to the finger having a search energy which exceeds the search critical value to the remaining fingers for each antenna, and demodulating the same and then feeding back to the steps ST1 through ST3.

The operation of the method for searching an access channel and allocating a finger for a base station in a conventional mobile communication system will be explained with reference to the accompanying drawings.

First, in the base station for a mobile communication system, the space for smoothing a multiple path fading operation is diversed. Namely, a signal receiving state from the mobile station is improved using more than two receiving antenna. Here, two antennas are used, and a base station having four fingers is used. The finger performs a function for demodulating a signal from the mobile station to the base station.

In the step ST1, in the base station having two receiving antenna and four fingers, a search unit for the base station despreads a receiving signal at a certain offset interval for the receiving antenna and computes the search energy.

In the step ST2, the computed search energies which correspond to the same offset for each antenna are summed and compared with a set search critical value for judging whether the signal is detected from the mobile station.

In the step ST3, the search unit stores the offsets with respect to the signals having a search energy above the set search critical value.

In the steps ST4 and ST5, the offset having the highest search energy among the stored offsets is selected and allocated to the finger. At this time, the base station allocates to the finger_0 connected with the first antenna if the selected offset is a signal corresponding to the first antenna. If the selected offset is a signal corresponding to the second antenna, the offset is allocated to the finger_2 connected with the second antenna. The finger_0 and the finger_1 are connected with the first antenna, and the finger_2 and finger_3 are connected with the second antenna.

The finger_0 and finger_2 to which the selected offsets are allocated, compute the finger energy with respect to the signal of the allocated offset and compares with the set finger critical value. If the computed finger energy is above a set finger critical value, in the step ST6, the signal corresponding to the offset is demodulated.

At this time, in the steps ST7 and ST8, the search unit computes the search energy with respect to the offset for searching the multiple path signal for the antenna. The offsets having the highest search energy, not the offset allocated to the finger_0 and finger_2 among the offsets having the search energy above the search critical value, are allocated to the remaining fingers. At this time, if the signal of the offset having the highest search energy is a signal corresponding to the first antenna, the allocation is made for the finger_1, and if the offset signal is a signal corresponding to the second antenna, the allocation is made for the finger_3.

In the step ST9, the filger_1 and finger_3 having the allocated offsets demodulate the signals of the offsets.

In the step ST1, the search unit searches whether the signals having an energy above the search critical value provided to a new offset is received.

In the steps ST2 through ST4, if the signal having a search energy above the set search critical value is received as another offset, not the offset allocated to the finger_0 and finger_3, the offset of the signal having the highest search energy is selected. Thereafter, the new offset is allocated to the other finger which performs the demodulation function with respect to the offset as another offset is allocated. Namely, the offset of a newly searched signal is allocated to the finger_0 and finger_2.

The finger_0 and finger_1 demodulate the multiple signal having a different time offset received into the first antenna, and the finger_2 and finger_3 demodulate the multiple signal having a different time offset received into the second antenna. Namely, one finger is connected with one antenna for thereby demodulating one access channel signal.

The search unit repeatedly performs the allocation with respect to the finger by searching a new multiple path signal. The search unit of the conventional base station allocates an access channel signal from the other mobile station to the finger in order to protect the access channel signal from the other mobile station before the decoding operation of the access channel signal with respect to one mobile station is completed.

Generally, when using a communication channel between the base station and the mobile station for the mobile communication system, the signal is spread using a spreading code which is different based on each mobile station and is transmitted from the mobile station to the base station. In addition, in the base station, the communication channel signal from the mobile station is despread based on the same spreading code as the mobile station for thereby separating the signal from the other mobile station.

The signal with respect to the offset in which the search energy of the receiving signal which despreads using the spreading code with respect to a certain mobile station exceeds a search critical value is a multiple path signal that a certain mobile station transmits.

When using the access channel, the mobile stations spread the signals using the same spreading code and transmit to the base station, and the base station despreads the signals using the same spreading code and searches an access channel signal with respect to the mobile stations.

The signals received based on the different offsets may not be considered as an access channel signal of a certain mobile station but considered as a signal having the access channel signal of the other mobile stations.

The known base station allocates one finger for each antenna and demodulates in order to modulate and demodulate the access channel signal from a certain mobile station. Since the offset of other access channel signal is allocated to the finger before one access channel demodulation operation is completed, a certain interference may occur between the access channel signals of the other mobile stations. Namely, after the finger with respect to the initial signal is allocated, an interference that another offset is reallocated to the finger before the decoding operation with respect to the signal is completed may occur.

In addition, when searching an access channel multiple path signal, if there is a difference in the offset value, since the signal may not be an access channel signal of the current demodulation mobile station but be an access channel signal of the other mobile station, the operation for obtaining an access channel signal of the current demodulation mobile station may be failed during the process that the base station search unit continuously allocates the signal received based on the other offset to the finger when demodulating the access channel signal of a certain mobile station.

In addition, since the success ratio of the access channel signal decoding operation between the base station and the mobile station is decreased, the operation for transmitting an access channel signal from the mobile station to the base station must be re-performed, so that the load of the reverse direction link is increased.

SUMMARY OF THE INVENTION

Accordingly, it is an object of the present invention to provide a method for searching an access channel and allocating a finger for a base station which overcomes the problems encountered in the conventional art.

It is another object of the present invention to provide a method for searching an access channel and allocating a finger for a base station which is capable of preventing an interference for an access channel signal between the mobile stations by stopping a signal search operation of a search unit after a search unit of a base station allocates an offset to a finger with respect to an access channel signal of a certain mobile station and preventing a multiple path signal, which may be an access channel signal from a new mobile station during an access channel probe period which corresponds to a duration needed for obtaining one access channel signal by a base station, from being re-allocated to a finger.

To achieve the above object, there is provided a method for searching an access channel and allocating a finger for a base station which includes a first step for searching an access channel signal, selecting a highest search critical value among the offsets having a search energy above a search critical value, allocating a finger in accordance with a path via which the selected offset signal is received and demodulating the signal, and a second step for checking whether an access channel probe period which corresponds to the time required until an access channel message unit is received and decoded is elapsed, stopping a search of a new multiple signal component to minimize any interference of the deciding operation of an access channel signal of another mobile station when one access channel probe period is not elapsed and feeding back to the first step when the access channel probe period is elapsed wherein there is provided a method for searching an access signal from a base station to a mobile station and allocating a finger for a CDMA mobile communication base station.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram illustrating a mobile station and base station according to the present invention;

FIG. 3 is a flow chart illustrating a method for searching an access channel and allocating a finger when allocating one finger to an antenna path according to the present invention;

FIG. 6 is a flow chart illustrating a method for searching a multiple path signal from a certain mobile station and reallocating to the finger when connecting a finger to two antenna paths according to the present invention;

FIG. 7 is a flow chart illustrating a method for allocating a finger when connection two fingers to an antenna according to the present invention.

DETAILED DESCRIPTION OF THE PREFERRED EMBODIMENTS

Figure 1:
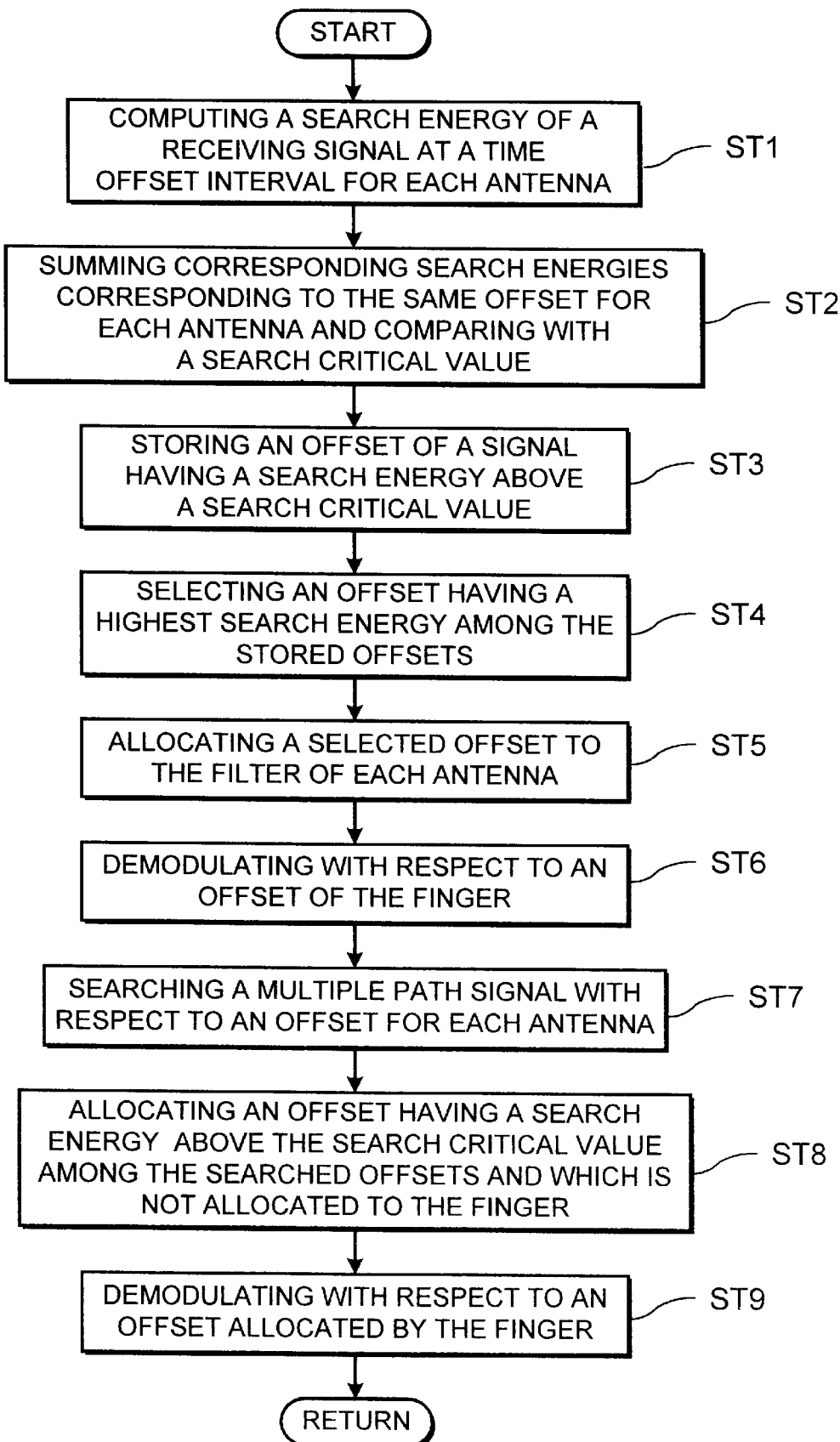
FIG. 1 is a flow chart illustrating a conventional method for searching an access channel and allocating a finger for a base station.

The embodiments of the present invention will be explained with reference to the accompanying drawings.

FIG. 2 is a block diagram illustrating a system for searching an access channel signal from a CDMA base station to a mobile station for implementing a decoding operation according to the present invention.

As shown therein, mobile stations 10 through 12 transmit signals for a call transmission request, a registration and call response via an access channel.

A base station 30 receives the access channel signals from the mobile stations 10 through 12 and performs a service request of the mobile stations 10 through 12. A search unit 40 searches the access channel signals from the mobile stations 10 through 12 and computes a time offset with respect to the access channel signal from one mobile station. A control unit 70 compares a search energy of an access channel signal searched by the search unit 40, selects a signal having the highest energy, allocates a finger in accordance with the selected signal, and controls the general operations until the access channel signal is received and decoded. The fingers 51 through 54 are connected with a corresponding antenna path of the base station in accordance with a control of the control unit 70 for demodulating an allocated access channel signal. The combining unit and decoding unit 60 combine and decode the access channel signal.

FIGS. 3 through 8 are flow charts illustrating a method for searching an access channel and allocating a finger for a mobile communication system according to the present invention.

Figure 4:
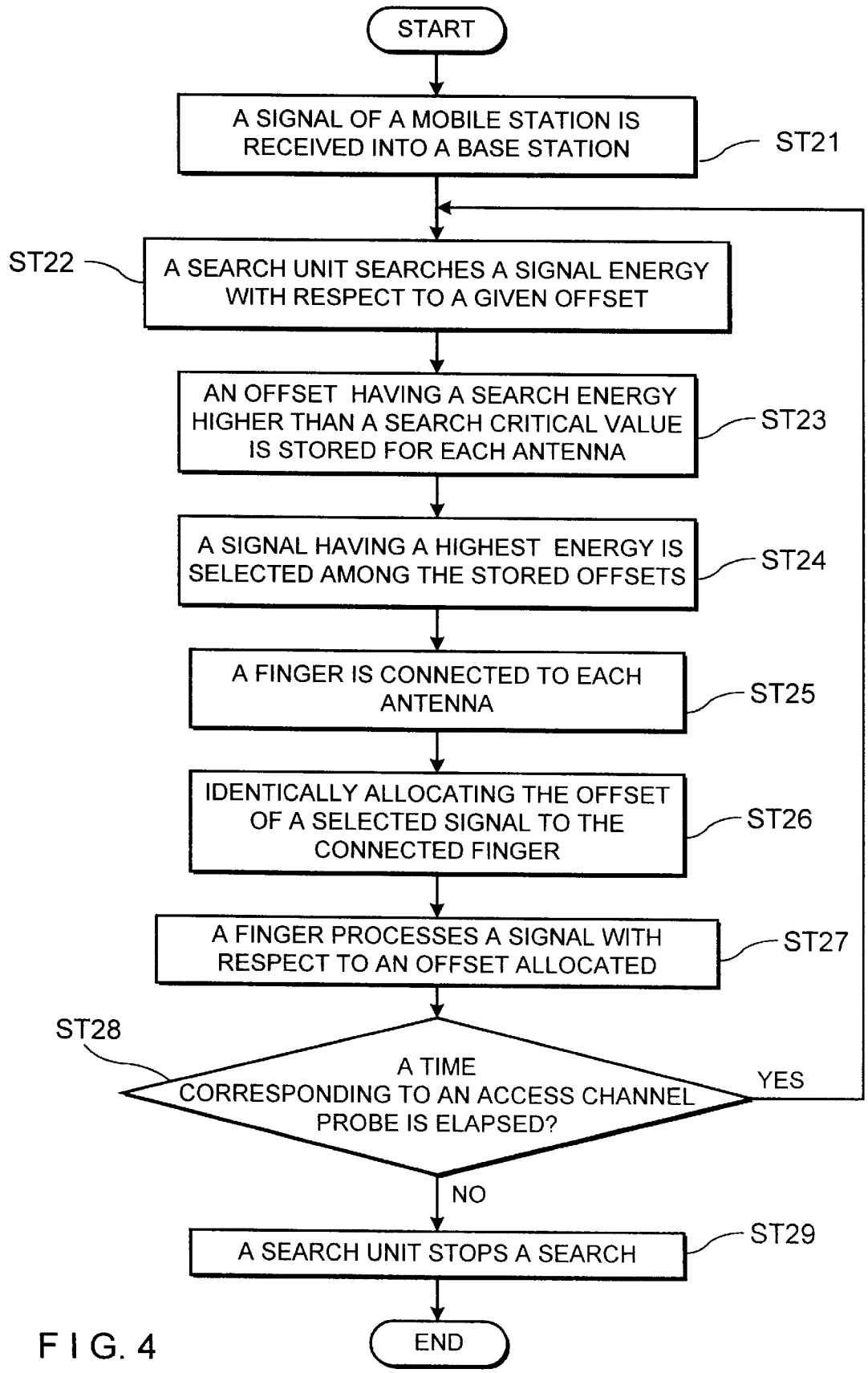
FIG. 4 is a flow chart illustrating a method for connecting a finger to two antenna paths, respectively and allocating the same offset to each finger according to the present invention.
Figure 5:
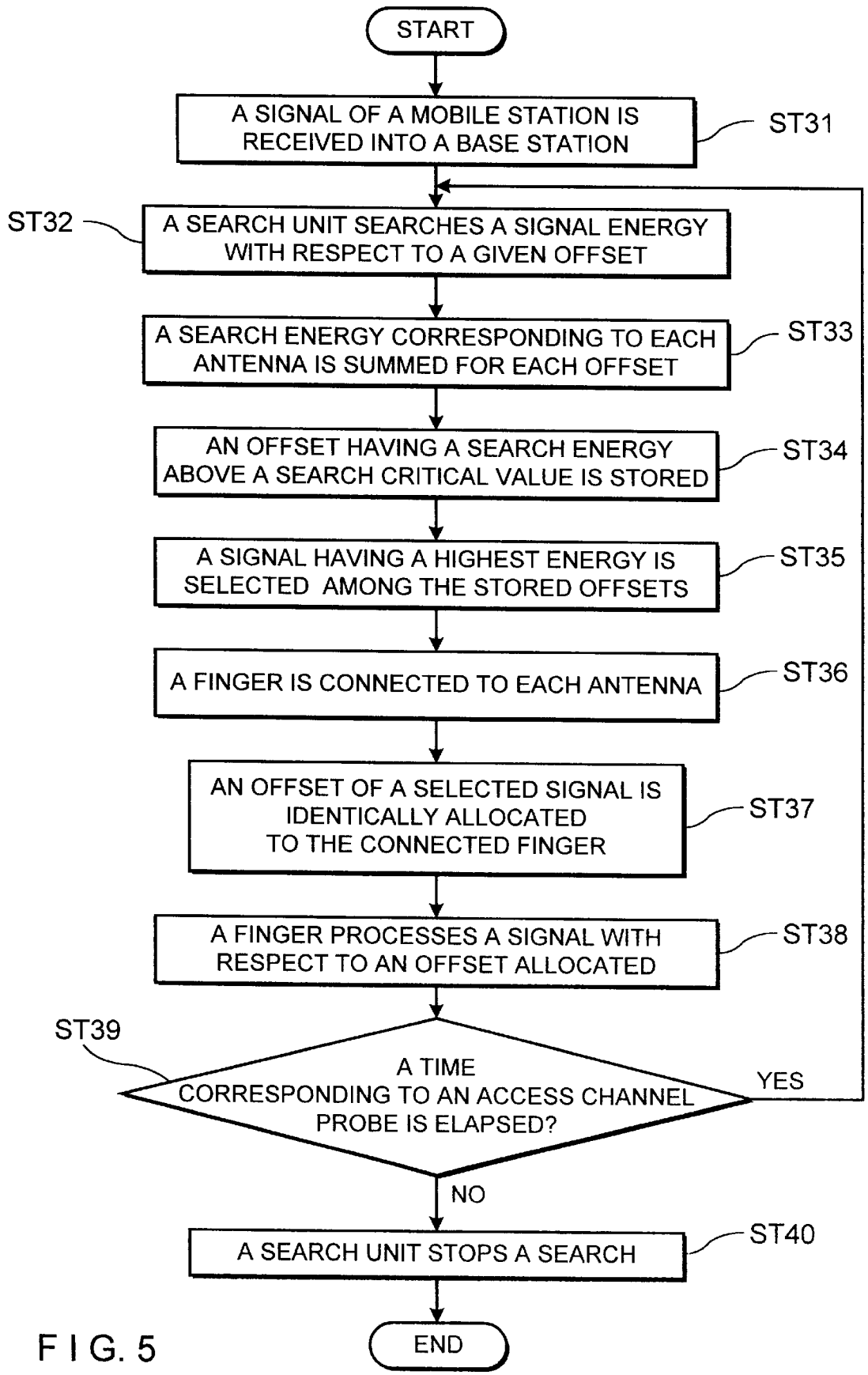
FIG. 5 is a flow chart illustrating a method for selecting a signal to be demodulated when allocating one finger to two antenna paths according to the present invention.

Namely, FIG. 3 is a flow chart illustrating a method for searching an access channel and allocating a finger when allocating one finger to an antenna path according to the present invention, FIG. 4 is a flow chart illustrating a method for connecting a finger to two antenna paths, respectively, and allocating the same offset to each finger according to the present invention, and FIG. 5 is a flow chart illustrating a method for selecting a signal to be demodulated when allocating one finger to two antenna paths according to the present invention.

Figure 8B:
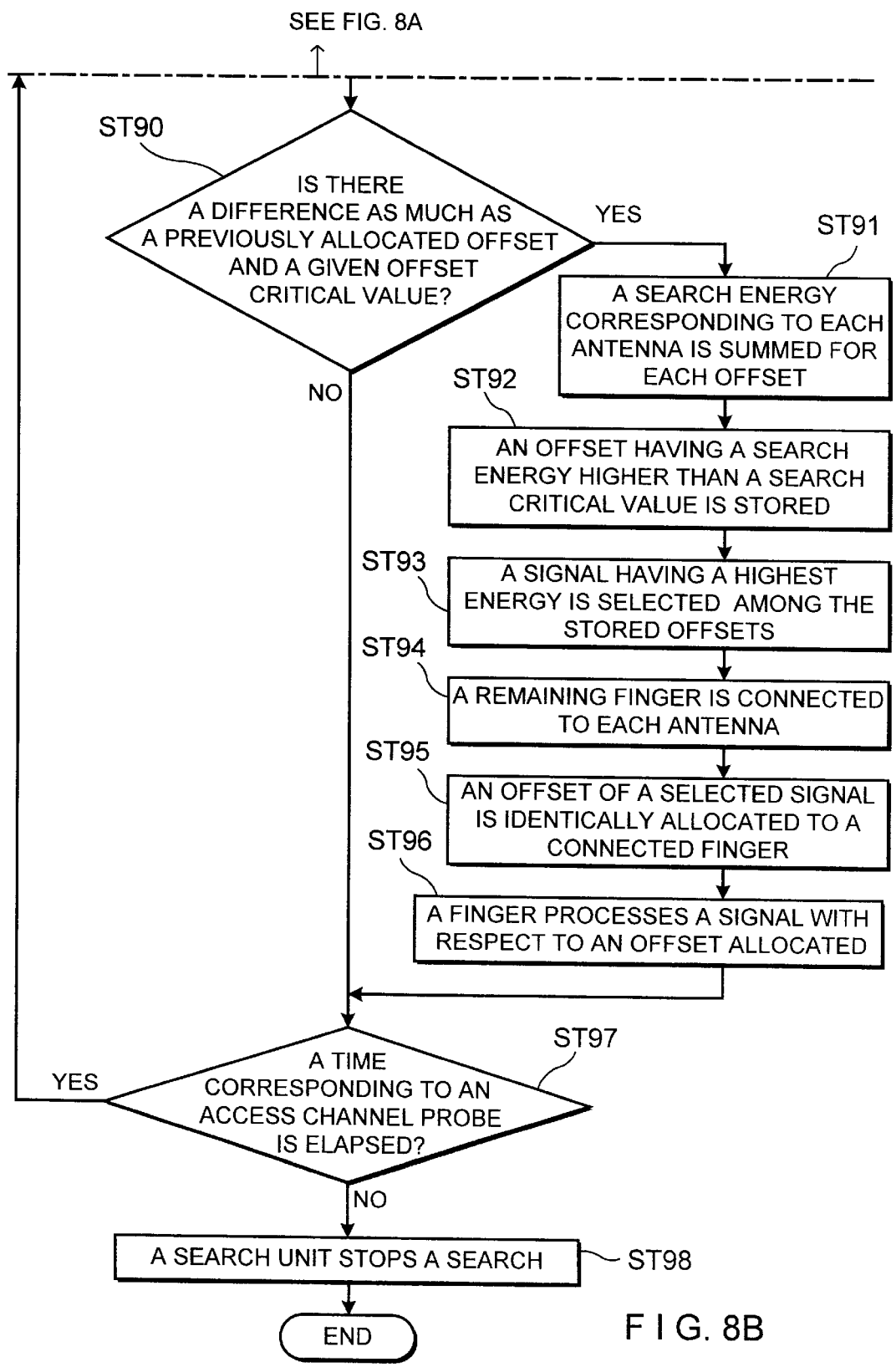
FIG. 8 is a method for searching a multiple path signal from a certain mobile station and allocating to the finger when connecting two fingers to an antenna according to the present invention.

In addition, FIG. 6 is a flow chart illustrating a method for searching a multiple path signal from a certain mobile station and re-allocating to the finger when connecting a finger to two antenna paths according to the present invention, FIG. 7 is a flow chart illustrating a method for allocating a finger when connection two fingers to an antenna according to the present invention, and FIG. 8 is a method for searching a multiple path signal from a certain mobile station and allocating to the finger when connecting two fingers to an antenna according to the present invention.

As shown in FIGS. 3 through 8, the method for searching an access channel and allocating a finger for a mobile communication system according to the present invention includes a first step for searching an access channel signal, selecting an offset having the highest search critical value among the offsets having a search energy above the search critical value, and demodulating a signal as the signal of the selected offset allocates a finger in accordance with the received path, and a second step for allocating a finger in accordance with the received path, and a second step for checking whether an access channel probe period which corresponds to the time until the access channel message unit is received and decoded is elapsed, stopping an operation for searching a new multiple path signal component for minimizing an interference for the decoding of the access channel signal of another mobile station if one access channel probe period is not elapsed, and feeding back to the first step if the access channel probe period is elapsed.

As shown in FIG. 3, the first step includes demodulation signal selection steps ST11 through ST14 for searching a signal energy with respect to the offsets set by the search unit 40, storing an offset having a search energy above the search critical value for each antenna, and selecting a signal having the highest search energy among the stored offsets, and finger allocation steps ST15 through 17 for demodulating the selected signal as the selected signal allocates the finger for the received antenna path.

As shown in FIG. 4, the first step includes demodulation signal selection steps ST21 through ST24 for searching a signal energy with respect to the set offset, storing an offset having the search energy above the search critical value for each antenna and selecting a signal having the highest search energy for each antenna, and finger allocation steps ST25 through ST27 for allocating a finger to two antenna paths, respectively, and demodulating the selected signal.

As shown in FIG. 5, the first step includes offset energy summing steps ST31 through ST33 for searching a signal energy with respect to the offsets set by the search unit 40 and summing a corresponding search energy of each antenna for each offset, and finger allocation steps ST36 through ST38 for storing an offset that the summed value exceeds the search critical value and selecting a signal having the highest search energy among the stored offsets, and finger allocation steps ST36 through ST38 for allocating a finger to two antenna paths, respectively, and demodulating the selected signal.

As shown in FIG. 6, the first step includes demodulation signal selection steps ST41 through ST44 for searching a signal energy with respect to the offset set by the search unit 40, storing an offset having a search energy above the search critical value for each antenna, and selecting a signal having the highest search energy among the stored offsets, first finger allocation steps ST45 through ST48 for allocating a finger to the antenna path via which the selected signal is received and demodulating the selected signal, and second finger allocation steps ST49 through ST52 for neglecting the finger connected in the first finger allocation steps ST45 through ST48 when the newly searched offset has a different receiving antenna, or the receiving antenna is same but there is a difference between the offset allocated to the finger and a certain offset critical value as the search unit 40 searches a new signal above the search critical value and then connecting another finger to the path.

As shown in FIG. 7, the first step includes demodulation signal selection steps ST61 through ST64 for searching a signal energy with respect to the offset set by the search unit 40, storing an offset having a search energy above the search critical value for each antenna and selecting a signal having the highest search energy among the stored offsets, first finger allocation steps ST65 through ST68 for allocating a finger to two antenna paths, respectively, and demodulating the selected signals, and second finger allocation steps ST69 through ST73 for storing the offset and allocating and demodulating one finger to each antenna if there is a difference in the newly searched offset as much as a difference between the allocated offset and the offset critical value as the search unit 40 searches a new signal above the search critical value.

As shown in FIG. 8, the first step includes offset energy summing steps ST81 through ST83 for searching a signal energy with respect to the offset set by the search unit 40 and summing a corresponding search energy for each antenna, first demodulation selection steps ST84 through ST85 for storing an offset in which the summed value is above the search critical value and selecting a signal having the highest search energy among the stored offsets, first finger allocation steps ST86 through ST88 for allocating a finger to two antenna paths, respectively, and demodulating the selected signal, offset energy re-summing steps ST90 through ST91 for checking whether the newly searched offset has a difference as much as the allocated offset and the offset critical value as the search unit 40 searches a multiple path signal from the same mobile station having higher than the search critical value and summing a corresponding search energy for each antenna based on the newly searched offset if there is a difference above the offset critical value, second demodulation signal selection steps ST92 through ST93 for storing an offset in which the summed value is above the search critical value, and selecting a signal having the highest energy among the stored offsets, and second finger allocation steps ST94 through ST96 for connecting a remaining finger for each antenna, allocating a newly selected offset to the finger, identically, and demodulating a newly selected signal.

The method for searching an access channel and allocating a finger for a mobile communication system according to the present invention will be explained with reference to the accompanying drawings.

First, the method for searching an access channel and allocating a finger in the case that one finger is allocated to one receiving antenna path according to the present invention will be explained with reference to FIG. 3.

In the step ST11, the base station 30 includes two antennas for receiving an access channel signal from the mobile station. In the steps ST11 and ST12, the search unit 40 searches a signal energy of an access channel with respect to the offset with respect to the signal received via each antenna.

In the step ST13, the control unit 70 stores an offset having a search energy above the search critical value among the offsets of the signal received via the first antenna between two antennas and stores an offset having a search energy above the search critical value among the offsets of the signal received via the second antenna.

In the step ST14, the control unit 70 selects a signal having the highest search energy among the stored offsets. At this time, in the step ST15, if the signal having the highest search energy is selected from the signals received via the first antenna, one finger is connected with the first antenna path. If the signal having the highest search energy is selected from the signals received via the second antenna, the finger is connected with the second antenna.

When one finger is connected with the first antenna path, in the step ST16, the control unit 70 allocates the offset of the selected signal to the finger. The finger demodulates a signal with respect to the allocated offset.

At this time, in the step ST18, the control unit 70 checks whether the access channel probe period which corresponds to the time required until one access channel message unit is received and decoded, is elapsed. If one access channel probe period is not elapsed, in the step ST19, the search operation of the search unit 40 is stopped.

When receiving an access channel signal from the base station, since the signal having different time offset may not a multiple path signal of the same mobile station, one signal is demodulated during one access channel probe period.

Therefore, the search operation of the search unit 40 is stopped during one access channel probe period for thereby preventing any interference when combining different signals.

As a result, the combining unit and decoding unit 60 is connected with the first antenna and combines and decodes an access channel signal demodulated by the finger in which a corresponding offset is allocated for thereby obtaining an accurate signal from one mobile station 10. Therefore, the mobile station responses and registers a call based on one access channel signal transmission.

Next, the method for searching an access channel and allocating a finger in the case when allocating one finger to two receiving antennas according to the present invention will be explained with reference to FIG. 4.

In the steps ST21 through ST24, the signals to be demodulated by the finger are selected in the same manner as when allocating one finger to one receiving antenna path as shown in FIG. 3. In the step ST26, one finger is connected with two antennas, respectively. The selected signals are allocated to the finger connected with each antenna. In the step S27, the finger connected with each antenna demodulates the signal with respect to the allocated offset.

At this time, in the step ST28, the control unit 70 checks whether the access channel probe period, which corresponds to the time required until one access channel message unit is received and decoded, is elapsed. As a result of the checking, if one access channel probe period is not elapsed, in the step S29, the search operation of the search unit 40 is stopped. Namely, the search operation of the search unit 40 is stopped during one access channel probe period. The signals demodulated by the fingers connected with each antenna are combined and decoded, so that any interference is prevented during the combining operation of other signals. In addition, as the same signals received via two receiving antennas, the receiving ratio of the access channel signals is increased.

Next, the method for searching an access channel and allocating a finger based on a method for selecting a signal to be demodulated by a finger according to the present invention will be explained with reference to FIG. 5.

In the step ST31, when an access channel signal is received via two antennas, respectively, in the step ST32, the search unit 40 searches a signal energy with respect to the offset. In the step ST33, the search energies corresponding to each antenna for the offset are summed. In the step ST34, the thusly summed value and a search critical value are compared, and the offset above the search critical value is stored.

In the step ST35, the signal having the highest search energy among the stored offsets is selected.

In the step ST36, the method for connecting a finger for demodulating the selected signal with a corresponding antenna is implemented in the same manner as the method of FIG. 4 for allocating one finger to two receiving antennas. One finger is connected with the first antenna and the second antenna, respectively. In the step ST38, if the offset of the selected signal is identically allocated to the finger connected with each antenna, each finger demodulates the allocated signals.

In the step ST39, the control unit 70 checks whether the access channel probe period, which corresponds to the time required until one access channel message unit is received and decoded, is elapsed. In the step ST40, as a result of the checking, if one access channel probe period is not elapsed, the search operation of the search unit 40 is stopped. Since the search of the multiple path signal having a high possibility that the received signal is an access channel signal from another mobile station is stopped based on another time offset, the signal which is considered as an access channel signal from another mobile station is reallocated to the finger which performs the decoding operation, so that any interference when combining the access channel signals between mobile stations is prevented.

Next, when allocating one finger to one antenna among two antennas, the method for searching an access channel and allocating a finger in the case that the signal having a search energy higher than the search energy which is first searched among the multiple path signals from the same mobile station is searched, will be explained with reference to FIG. 6.

The method for selecting the signal to be demodulated by the finger and allocating the selected signal to the finger is performed in the same manner as the method for allocating one finger with respect to one receiving antenna in the base station 30 having two receiving antennas. Therefore, the selected signal is allocated and demodulated by one finger allocated to the antenna path of the selected signal.

In the step ST48, the search unit 40 searches a signal, which exceeds the search critical value, from the mobile station.

In the steps ST49 and ST51, in the case that the offset of the multiple path signal from the same mobile station exceeds the search critical value and is the same as the offset allocated to the finer, and the receiving antenna is different, the control unit 70 stores a newly searched offset and selects a signal having the highest search energy among the stored offsets.

In addition, in the steps ST50 and ST51, in the case that the offset of the multiple path signal from the same mobile station is the same antenna as the receiving antenna connected with the finger and has a certain difference by the offset allocated to the finger and the offset critical value, the control unit 70 stores a newly searched offset and selects a signal having the highest search energy among the stored offsets.

In the step ST52, the finger connected with the selected antenna path is neglected, and another finger is connected with the path.

In the step ST53, the control unit 70 checks whether the access channel probe period which corresponds to the time required until one access channel message unit is received and decoded, is elapsed. In the step ST54, if one access channel probe period is not elapsed, the search operation of the search unit 40 is stopped. Namely, a combining operation of other signals is not interfered by stopping the search operation of the search unit 40 during one access channel probe period.

Next, in the case that a finger is allocated to two receiving antenna paths, respectively, of the base station 30, and a multiple path signal of the same mobile station is searched, and a finger is allocated to each antenna, the method for searching an access channel and allocating a finger according to the present invention will be explained with reference to FIG. 6.

The method for selecting a signal to be demodulated by the finger and the method for allocating a finger by which the selected signal is demodulated ate the same as the method as shown in FIG. 4 which is directed to the case that the finger is allocated to two receiving antennas of the base station 30.

In the step ST68, the search unit 40 searches a multiple path access channel signal from the same mobile station, and in the steps ST69 and ST71, if the offset of the signal above the search critical value has a difference as much as the allocated offset and the offset critical value, the above-described offset is stored, and a remaining finger is connected with each antenna. In the step ST72, a newly selected signal offset is allocated to the finger to be connected, and in the step ST73, the finger demodulates the signal of the allocated offset.

In the step ST74, the control unit 70 checks whether an access channel probe period which corresponds to the time required until one access channel message unit is received and decoded is elapsed.

In the step ST74, if the signal from the newly searched same mobile station 109 does not exceed the search critical value, the control unit 70 checks whether one access channel probe period is elapsed.

In the step ST75, if one access channel probe period is not elapsed, the search operation of the search unit 40 is stopped. Namely, the search operation of the search unit 40 is stopped during one access channel probe period, so that any interference during a signal combining operation does not occur.

In the steps ST74 and ST62, the controller 70 checks whether one access channel probe period is elapsed. As a result of the checking, if the access channel probe period is elapsed, the search unit 40 continuously searches a new access channel signal.

Finally, in the case that the signal having the highest search critical value is selected from each antenna, and the offset of the signal to be demodulated by summing the signal having the highest search critical value of each antenna is selected, and the multiple path signal is searched from the same mobile station, and two fingers are allocated to each antenna, the method for searching an access channel and allocating a finger according to the present invention will be explained with reference to FIG. 8.

In the steps ST81 and ST82, the energy of the signals received via the first and second antennas is searched with respect to the offset set by the search unit 40. In the steps ST83 and ST88, the method for selecting a signal to be demodulated and allocating the same according to the present invention is performed in the same manner as the embodiment of FIG. 5.

At this time, in the step ST89, the search unit 40 searches a multiple path signal from the same mobile station having a value above the search critical value.

In the steps ST90 and ST97, the control unit 70 checks whether the offset of a newly searched signal has a difference as much as the previously allocated offset and the offset critical value. As a result of the checking, if there is not a difference above the offset critical value, it is checked whether one access probe period is elapsed.

In the step ST91, as a result of the checking, if a newly searched offset has a difference as much as the previously allocated offset and the offset critical value, a search energy which corresponds to each antenna is summed for each offset. In the step ST92, the offset of the signal above the search critical value of the newly searched signal is stored. In the step ST93, the signal having the highest search energy is selected among the stored offsets. In the step ST94, a remaining finger is connected with each antenna, respectively. In the step ST95, the offset of the signal selected by the connected finger is allocated identically. In the step ST96, the finger newly connected with the antenna demodulates the allocated signal. Two fingers are allocated to the first and second antennas, and the multiple path access signal of a certain mobile station is demodulated based on the multiple path by allocating two fingers to the first and second antennas.

In the step ST97, the control unit 70 checks whether the access channel probe period which corresponds to the time required until one access channel message unit is received and demodulated is elapsed. In the step ST98, as a result of the checking, if one access channel probe period is not elapsed, the search operation of the search unit is stopped. In the step ST82, if one access channel probe period is elapsed, the control unit 70 continuously searches a new access channel signal.

The access channel signal from the mobile station to the base station is spread and transmitted to the base station using the same spreading code, and the access channel signal is despread using the same spreading code by the base station, so that it is impossible to recognize whether a certain access channel signal is a signal from the mobile station before the access channel signal is decoded by the base station. Namely, the base station is capable of recognizing the original mobile station of the signal after the access channel signal from the mobile station is decoded. When demodulating the multiple path signal, the access channel signal transmitted from another mobile station may be demodulated together.

The signal received from the mobile station during one access channel probe period is allocated to the finger and is demodulated. Since the access channel signal from the base station having different time offsets may not be the multiple path signal from the same mobile station, the re-allocation to the finger is prevented. When obtaining the access channel signal from the mobile station, any interference of the access channel signal from another mobile station is prevented.

In addition, since the possibility for obtaining the access channel signal from the mobile station is increased, there is not the case that the base station does not obtain a signal from the mobile station, and the mobile station does not re-transmit the access channel signal.

As described above, in the method for searching an access channel search and allocating a finger for a mobile communication system according to the present invention, the access channel signals from the base station and having different time offset stop the search of a new multiple path signal having a high possibility that the multiple path signal of the same mobile station has during one access channel probe period, so that it is possible to prevent any access channel signal interference between the mobile stations.

Therefore, the ratio for obtaining an access channel signal from a certain mobile station is increased at the base station by preventing any interference between the access channel signals from different mobile station, so that it is possible to prevent a re-transmission of the access channel signal from the mobile station due to a receiving failure of the access channel signal at the base station.

The signal processing load of the access channel between the mobile station and the base station is decreased by decreasing the possibility that the access channel signal is re-transmitted from the mobile station to the base station, so that it is possible to increase the number of subscribers within a limited capacity of the system and decrease the power consumption of the mobile station.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a method for searching for an access signal from a base station to a mobile station and allocating a finger for a CDMA mobile communication base station, the method comprising the steps of:

searching for an access channel signal, selecting the highest search critical value from offsets having a search energy above a search critical value, allocating a finger in accordance with a path via which the selected offset signal is received and demodulating the selected offset signal; and checking for an access channel probe period which corresponds to time required until an access channel message unit is received and decoding has elapsed, stopping a search for a new multiple signals component to minimize any interference with the deciding operation of an access channel signal of another mobile station when one access channel probe period is not elapsed and feeding back to the access channel signal searching step when the access channel probe period is elapsed.

2. The method of claim 1, wherein said step for searching for an access channel signal includes:

a demodulation signal selector for searching for a signal energy with respect to the offsets set by the search unit of the base station, storing the offset having a search energy above the search critical value for each antenna, and selecting the signal having the highest search energy among the stored offsets; and allocating a finger for demodulating the selected signal as the selected signal allocates a finger for the received antenna path.

3. The method of claim 1, wherein said step for searching for an access channel signal includes:

a demodulation signal selector for searching for a signal energy with respect to the offset set by the search unit of the base station, storing an offset having the search energy above the search critical value for each antenna and selecting the signal having the highest search energy among the stored offsets; and allocating a finger for allocating the first finger to two antenna paths of the base station and demodulating the selected signal.

4. The method of claim 1, wherein said step for searching for an access channel signal includes:

summing offset energy for searching for a signal energy with respect to the offsets set by the search unit of the base station and summing a corresponding search energy of each antenna for each offset;

a demodulation signal selector for storing an offset in which the summed value is above the search critical value and selecting the highest search energy among the stored offsets; and allocating a finger for assigning the finger to two antenna paths of the base station and demodulating the selected signal.

5. The method of claim 1, wherein said step for searching for an access channel signal includes:

a demodulation signal selector for searching for a signal energy with respect to the offset set by the search unit of the base station, storing an offset having a search energy above the search critical value for each antenna and selecting a signal having the highest search energy among the stored offsets;

allocating a first finger for allocating the first finger to two antenna paths, respectively, and demodulating the selected signals; and allocating a second finger for the search unit which searches a new signal above a search critical value, and a receiving antenna connects another finger to the path by neglecting the previously connected finger in the first finger allocation when the newly searched offset has a different receiving antenna, and the receiving antenna is the same but has a difference as much as the offset allocated to the finger and a certain offset critical value.

6. The method of claim 1, wherein said step for searching for an access channel signals includes:

a demodulation signal selector for searching for a signal energy with respect to an offset set by a search unit of the base station, storing an offset having a search energy above a search critical value for each antenna and selecting the first highest search energy among the stored offsets;

allocating a first finger for allocating the first finger to two antenna paths, respectively, and demodulating the selected signal; and allocating a second finger for searching a new signal above a search critical value by the search unit, storing the offset when a newly searched offset has a difference as much as the previously allocated offset and the offset critical value, allocating a remaining finger to each antenna and demodulating the same.

7. The method of claim 1, wherein said step for searching for an access channel signal includes:

an offset energy summer for searching for a signal energy with respect to the offset set by the search unit of the base station and summing a corresponding search energy for each antenna by the offset;

a first demodulation selector for storing an offset in which the summed value is above the search critical value and selecting a signal having the highest search energy among the stored offsets;

a first finger allocation for allocating the first finger to two antenna paths, respectively, and demodulating the selected signal;

an offset energy re-summer for checking whether the newly searched offset has a difference as much as the allocated offset and the offset critical value as the search unit searches a multiple path signal from the same mobile: station having a value higher than the search critical value and summing a corresponding search energy for each antenna based on the newly searched offset if there is a difference above the offset critical value;

a second demodulation signal selector for storing an offset in which the summed value is above the search critical value, and selecting a signal having the highest energy among the stored offsets; and a second finger allocator for connecting a remaining finger for each antenna, allocating a newly selected offset to the finger, identically, and demodulating a newly selected signal.

* * * * *